(12) United States Patent
Lindoff et al.

(10) Patent No.: US 8,050,369 B2
(45) Date of Patent: Nov. 1, 2011

(54) SYSTEM AND METHOD OF RECEIVING AND PROCESSING MULTICOMMUNICATION SIGNALS

(75) Inventors: Bengt Lindoff, Bjärred (SE); Niklas Andgart, Södra Sandby (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 541 days.

(21) Appl. No.: 12/324,381

(22) Filed: Nov. 26, 2008

(65) Prior Publication Data

US 2009/0257533 A1  Oct. 15, 2009

Related U.S. Application Data

(60) Provisional application No. 61/044,588, filed on Apr. 14, 2008.

(51) Int. Cl.
*H04B 7/10* (2006.01)

(52) U.S. Cl. ........................................ 375/347; 375/349

(58) Field of Classification Search .................. 375/347, 375/349, 260, 316
See application file for complete search history.

(56) References Cited

U.S. PATENT DOCUMENTS

| | | | | |
|---|---|---|---|---|
| 7,486,751 B1 * | 2/2009 | Pare et al. | ...................... | 375/347 |
| 2006/0153283 A1 | 7/2006 | Scharf et al. | | |
| 2007/0160158 A1 | 7/2007 | Zeng et al. | | |
| 2008/0008082 A1 * | 1/2008 | Ma et al. | ...................... | 370/203 |
| 2008/0013442 A1 | 1/2008 | Fechtel | | |
| 2008/0159123 A1 * | 7/2008 | Tehrani et al. | ................ | 370/208 |
| 2009/0154631 A1 * | 6/2009 | Wepfer et al. | ................ | 376/205 |

FOREIGN PATENT DOCUMENTS

| | | |
|---|---|---|
| EP | 1876729 A1 | 1/2008 |
| WO | 2006/034401 A2 | 3/2006 |

OTHER PUBLICATIONS

"International Search Report," application No. PCT/EP2009/053658. Mailing date: Aug. 25, 2009. European Patent Office, Rijswijk, Netherlands.
"Discussion on potential requirements for a spectrum aggregation function." 3GPP Draft; R2-052925. Nov. 3, 2005. 6 pages. 3rd Generation Partnership Project, Sophia-Antipolis, France.
"System Level Performances of Non-contiguous RB assignment for LTE-Advanced Uplink." 3GPP Draft; R1-090020. Jan. 12, 2008. 6 pages. 3rd Generation Partnership Project, Sophia-Antipolis, France.

(Continued)

*Primary Examiner* — Emmanuel Bayard
(74) *Attorney, Agent, or Firm* — Coats & Bennett, P.L.L.C.

(57) ABSTRACT

A receiver receives and front-end processes a plurality of component carrier signals, each carrier spaced apart in frequency. The digitized, baseband component carrier signals are inspected to determine estimates of timing offsets between the carriers. A control unit selects a first component carrier signal having data scheduled to the receiver. If data is scheduled to the receiver on other component carrier signals, the control unit generates timing and frequency offset adjustment control signals to time- and frequency-align each other component carrier signal having relevant data, to the first component carrier signal. All the relevant component carrier signals are then combined, and a single OFDM symbol, spanning all the relevant component carriers, is presented to an FFT for symbol detection.

19 Claims, 5 Drawing Sheets

OTHER PUBLICATIONS

"RACH Procedure for Asymmetric Carrier Aggregation." 3GPP Draft; R1-090284. Jan. 12, 2008. 4 pages. 3rd Generation Partnership Project, Sophia-Antipolis, France.

"Anchor component carrier." 3GPP Draft; R1-090382. Jan. 16, 2008. 2 pages. 3rd Generation Partnership Project, Sophia-Antipolis, France.

Report of the 3GPP TSG RAN IMT Advanced Workshop, Shenzhen, China. Apr. 7-8, 2008. 3GPP Draft; REV-080060_IMT_ADV_WS_Report. 34 pages. 3rd Generation Partnership Project, Sophia-Antipolis, France.

* cited by examiner

SYSTEM AND METHOD OF RECEIVING AND PROCESSING MULTICOMMUNICATION SIGNALS

This application claims priority to U.S. Provisional Patent Application Ser. No. 61/044,588, filed Apr. 14, 2008, and incorporated herein by reference in its entirety.

TECHNICAL FIELD

The present invention relates generally to the field of wireless communication, and in particular to a multi-carrier receiver, receiving data in multiple component carrier signals.

BACKGROUND

With each generation, wireless communication systems are characterized by ever-higher data rates. While some increase in data rates may be attributed to improvements in modulation, coding, and the like, significant increases in data rates generally require higher system bandwidths. For example, the IMT advanced, a proposed fourth generation (4G) wireless communication system, contemplates bandwidths up to 100 MHz. However, the radio spectrum is a limited resource. Since many operators and systems compete for limited radio resources, it is unlikely that 100 MHz of contiguous spectrum will be free for such systems.

One approach to increasing bandwidth requirements in limited, fragmented spectrum is to aggregate non-contiguous spectrum, as depicted in FIG. 1. From a baseband point of view, this can effectively increase system bandwidth sufficiently to support up to 1 Gb/s, a throughput requirement for 4G systems. Transmitting data in non-continuous parts of the spectrum also introduces flexibility, as spectrum utilization may be adapted to existing spectrum use and geographical position. Additionally, different modulation and coding schemes may be advantageously applied to different portions of the spectrum.

A possible evolution of current cellular systems, such as the 3GPP Long Term Evolution (LTE), to support non-contiguous spectrum is to introduce multiple component carriers. In a multiple component carrier system, each separate portion of spectrum may be considered a Release 8 LTE system. A 4G mobile terminal will in such a case be capable of receiving multiple LTE carriers, of different bandwidths, and transmitted at different carrier frequencies, and in such a terminal new problem areas may be introduced.

SUMMARY

According to one or more embodiments of the present invention, a multiple component carrier receiver receives and front-end processes a plurality of component carrier signals. The digitized, baseband component carrier signals are inspected to determine estimates of timing offsets between the carriers. A control unit selects a first component carrier signal having data scheduled to the receiver. If data is scheduled to the receiver on other component carrier signals, the control unit generates timing and frequency offset adjustment control signals to time- and frequency-align each other component carrier signal to the first component carrier signal. All relevant component carrier signals are then combined, and a single OFDM symbol, spanning all relevant component carriers, is presented to an FFT for symbol detection.

One embodiment relates to a method, in a wireless communication system receiver, of receiving and processing signals comprising two or more component carriers spaced apart in frequency. Two or more component carrier signals are received and front-end processed. The timing and relative frequency offset between a first component carrier signal and one or more other component carrier signals is determined. At least one of the timing and frequency of the one or more other component carrier signals is adjusted so as to time-align and frequency-align them with the first component carrier signal. The time-aligned and frequency-aligned component carrier signals are added to produce a single, combined signal. The combined signal is Fast Fourier Transform processed to detect transmitted symbols.

DETAILED DESCRIPTION

Although the multiple component carrier LTE approach may seem conceptually straightforward, it is a non-trivial task to design a mobile terminal capable of receiving and processing multiple LTE carrier signals. The aggregated spectrum approach requires that the radio receiver be capable of receiving two (or more) separate OFDM-modulated carriers. Due to time misalignment between different component carriers arising from different radio channel propagation, the Transmission Time Intervals (TTI) will not coincide in the mobile terminal. This is particularly true in the case of Distributed Antenna System (DAS)/Coordinated Multipoint Transmission (CoMP), where the signals on the different component carriers are transmitted from different base station antennas that are physically significantly separated from each other.

Another source of time offset is the use of different receiver front-end chains to process the different component carriers. Some of the carriers may require more advanced (steeper) filtering, due to blocking requirements, which introduces more time delay in the radio receiver.

One solution to the time misalignment of component carrier signals is to calculate a Fast Fourier Transform (FFT) separately for each component carrier signal. A disadvantage of such a solution is that the FFT processing must be performed separately on each component carrier signal. This requires either a faster FFT, working at a higher sampling rate, to process multiple component carrier signals, or multiple FFTs. A faster FFT introduces greater complexity and cost, and multiple FFTs consume more silicon area. Both solutions increase power consumption.

Another problem arising in multiple component carrier systems is that different component carriers may not fit the same sub-carrier space raster. This may happen when the distance between the component carrier frequencies (i.e. the center frequencies of the component carriers) is not an integral multiple of the sub-carrier spacing or when two different receiver front-end chains are used, and each front-end chain introduce a different frequency error. A solution to such a problem is again to perform separate FFT processing for each component carrier signal, after separation in the analogue or digital domain. This has the same limitations and disadvantages as described above. In order to address at least some of these issues, methods and receivers as discussed herein may be used.

Figure 1:
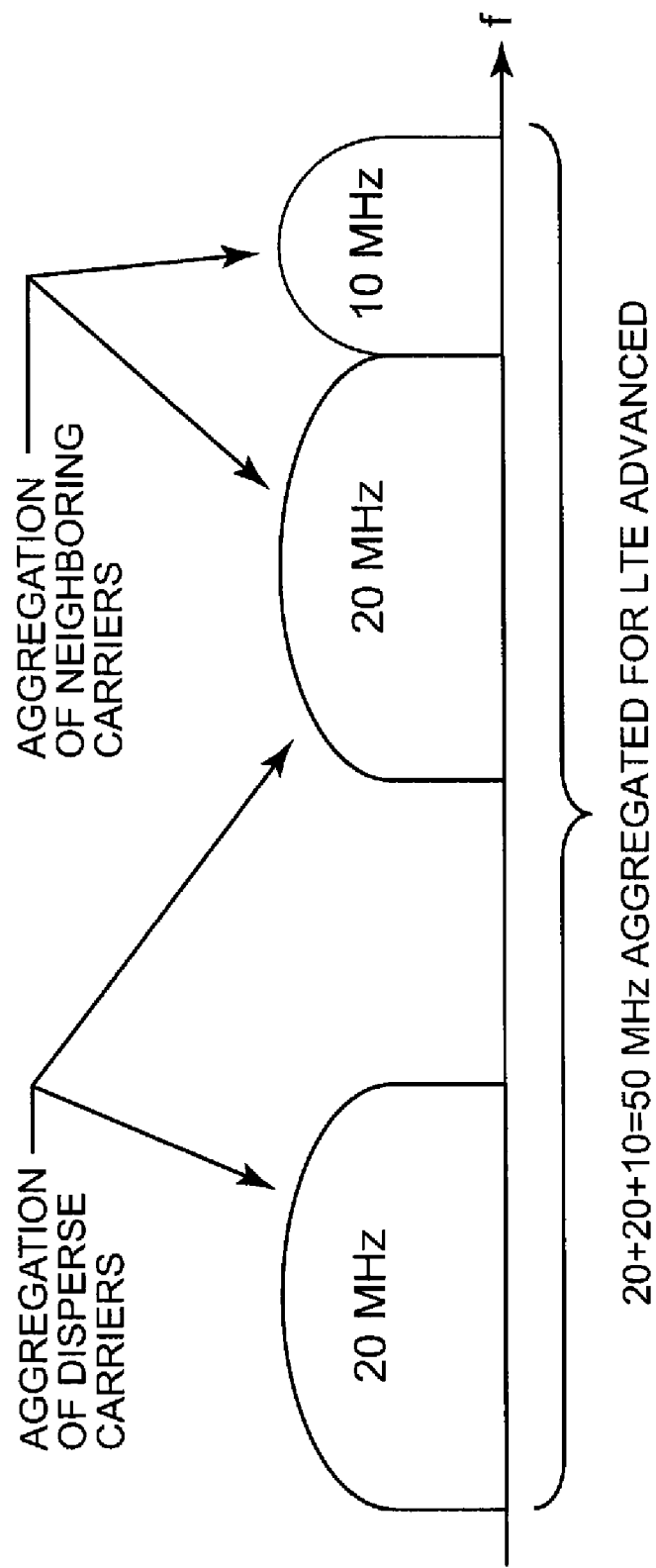
FIG. 1 is a frequency plot showing multiple component carriers.
Figure 2:
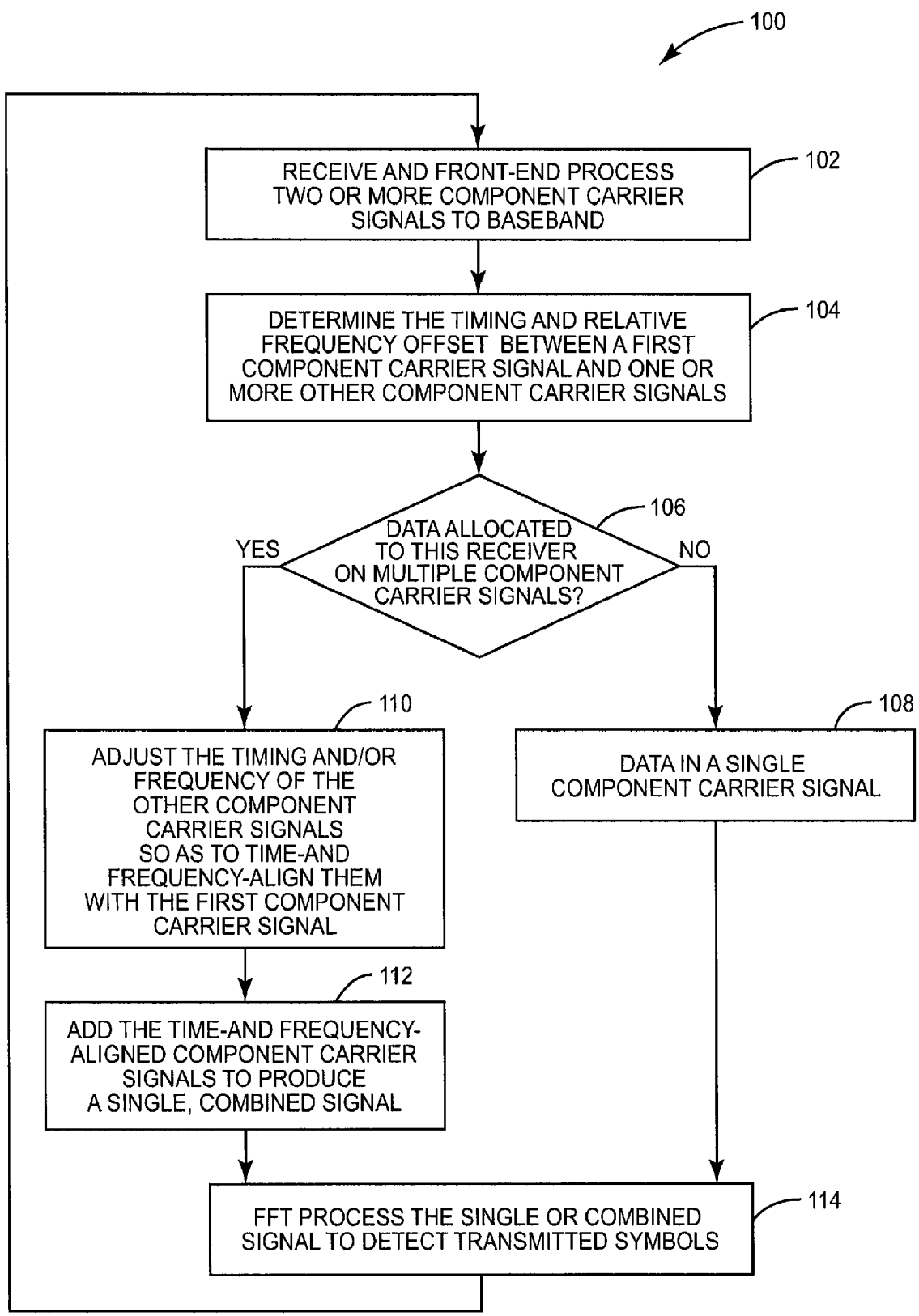
FIG. 2 is a flow diagram of a method of receiving and processing multiple component carrier signals.

FIG. 2 depicts a method 100, performed in a wireless communication system receiver, of receiving and processing signals comprising two or more component carriers spaced apart in frequency, according to one or more embodiments of the present invention. The component carriers may be, as is described below in the non-limiting example, Orthogonal Frequency Division Multiplexing (OFDM) carriers, or some other type of carrier utilizing some type of Fast Fourier Transforms, such as Single Carrier Frequency Division Multiple Access (SC-FDMA) carrier. The receiver receives and front-end processes the two or more component carrier signals, each transmitted on spaced-apart carrier frequencies (step 102). As known in the art, the front-end processing includes low-noise amplification, filtering, and digitization. The receiver determines the relative timing and frequency offset between the component carrier signals (step 104). For two component carrier signals, the relative timing and frequency offset between them is determined. For three or more component carrier signals, a reference component carrier signal is selected (referred to herein as a "first" component carrier signal, only as a term of reference), and timing and frequency offsets are determined for all other component carrier signals relative to the first component carrier signal. The timing may be determined, for example, by correlating to dedicated synchronization or reference symbols, also known in the art as pilot symbols.

The receiver obtains information about carrier frequencies for respective component carriers, such as by monitoring a control channel on an anchor, or master, component carrier. The receiver also obtains information regarding whether data scheduled for the receiver is included in only one component carrier signal, or in a plurality of component carrier signals (step 106). If the data is in only one component carrier signal (step 108), that signal is received and FFT processed conventionally (step 114). If the data for the receiver is in a plurality of component carrier signals (step 106), the receiver adjusts at least one of the timing and frequency of all other component carrier signals so as to time-align and frequency-align them with the first component carrier signal (step 110). The component carrier signals are time-aligned such that the majority of the multi-path component energy for all component carriers falls within the cyclic prefix of a symbol. The component carrier signals are frequency-aligned so as to align them on the same sub-carrier raster. The receiver then adds the time-aligned and frequency-aligned component carrier signals to produce a single, combined signal (step 112). The combined signal, comprising an OFDM symbol spanning all combined component carrier signals, is then FFT processed together to detect the transmitted symbol (step 114).

Figure 3:
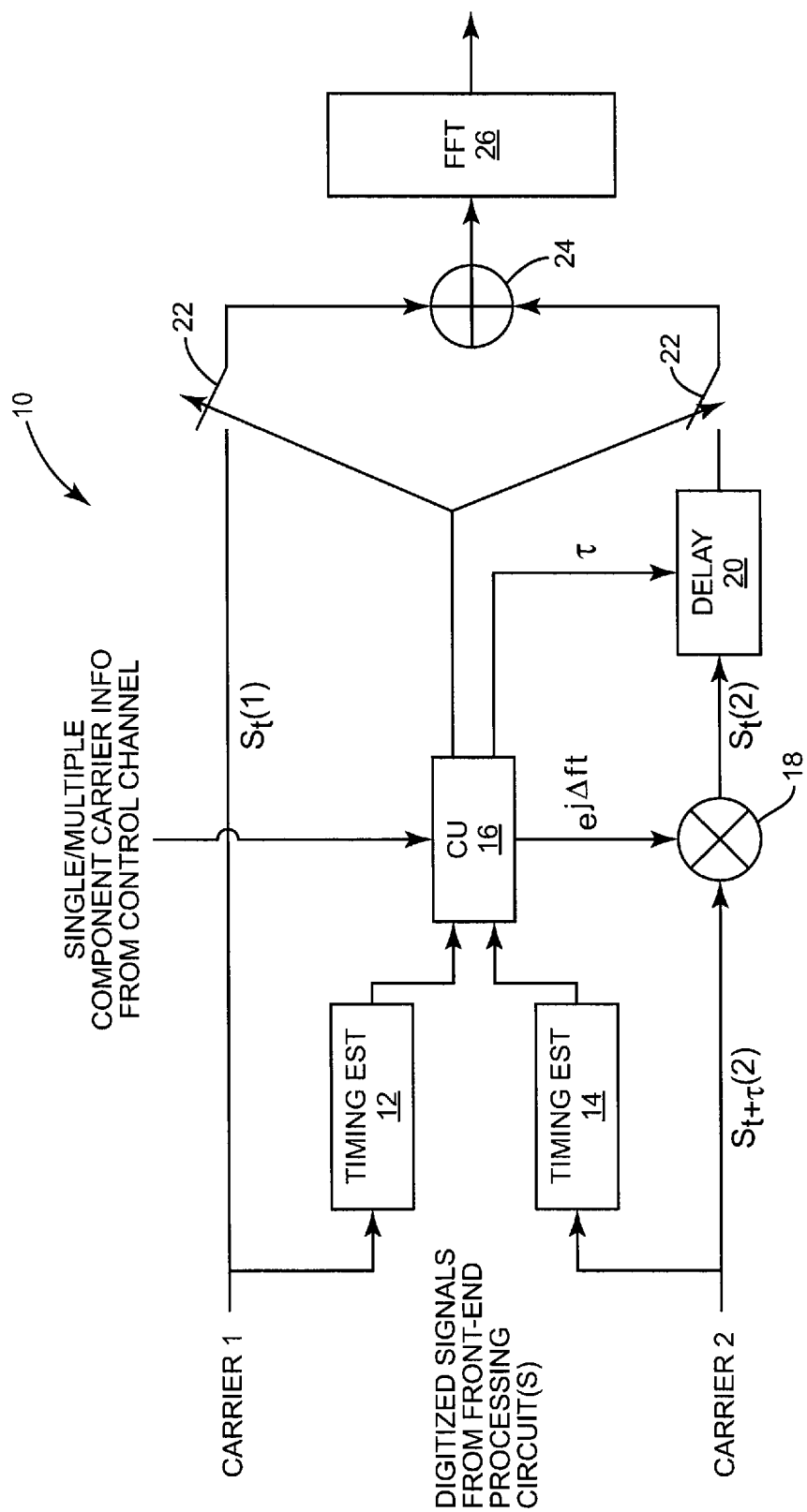
FIG. 3 is a functional block diagram of a single-FFT, multiple component carrier receiver implementing timing and frequency adjustments and combining component carrier signals.

FIG. 3 depicts time- and frequency-adjustment, and combination, of e.g. two component carrier signals in a receiver controller 10. Baseband, digitized signals for component carriers 1 and 2 are received from ADCs in front-end processing circuits, and are provided to timing estimators 12, 14. The timing estimators 12, 14 estimate the relative timing between the two carriers. A control unit 16 stores the timing information (which is updated on a regular basis). The control unit 16 receives information whether data scheduled for the terminal is in a single or multiple component carrier signals. If the data is in multiple component carrier signals, the control unit 16 calculates and outputs frequency and time control signals.

The frequency control signal $e^{j\Delta ft}$, where $\Delta f$ is the frequency offset between component carriers 1 and 2, controls a mixer 18 operative to adjust the frequency of the component carrier 2 signal so as to align it on the same sub-carrier raster as the component carrier 1 signal. The time control signal $\tau$ controls a delay unit 20 that delays the component carrier 2 signal so that the multi-path component energy for component carrier 1 and 2 signals both fall within the cyclic prefix of a symbol.

The control unit 16 outputs timing signals that control the gating of component carrier 1 and 2 signals (depicted functionally as switches 22) to an adder 24, which combines them to generate an entire OFDM symbol spanning both component carriers 1 and 2. The combined symbol is processed by an FFT unit 26.

Although the controller 10 has been depicted as operating on two component carrier signals, extension to three or more is straightforward. If the control channel signaling indicates data scheduled for the receiver on three or more component carrier signals, a first component carrier signal is selected, and all other component carrier signals are time- and frequency-aligned to the first component carrier signal. The signals are then combined to FFT process an entire OFDM symbol spanning all relevant component carriers.

Figure 4:
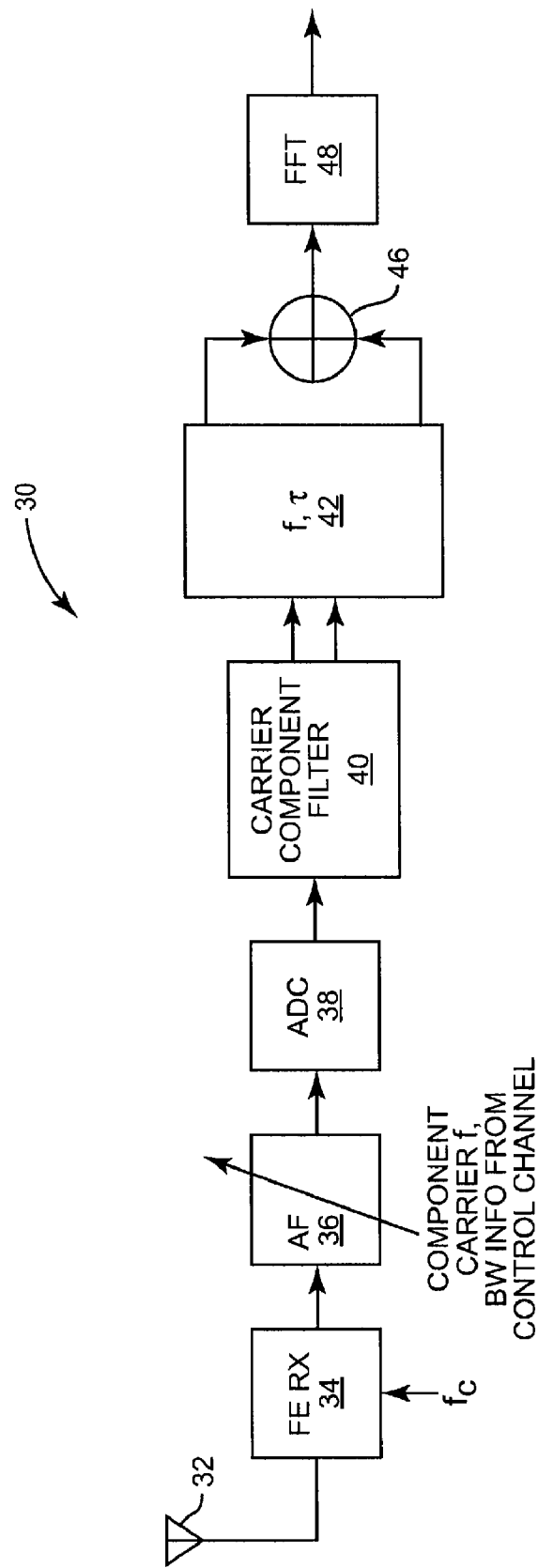
FIG. 4 is a functional block diagram of a single front-end receiver chain for a multiple component carrier receiver with a carrier component filter to separate component carrier signals.

FIG. 4 depicts a single front-end receiver chain 30 operative to receive and front-end process two or more component carrier signals, according to one embodiment of the present invention. A composite signal is received at an antenna 34 and low-noise amplified at receiver 34, and filtered at variable-frequency analog filter 36, based on information regarding the component carrier frequencies and bandwidth information obtained, e.g., from a control channel. The analog filter 36 may comprise a band pass filter removing potential blockers outside of, and in between, the component carriers. The composite signal is then digitized by Analog to Digital Converter 38.

The component carrier signals are separated from the composite signal by a Component Carrier Filter unit 40. In one embodiment, the component carrier filters are implemented as digital band pass filters. In another embodiment, the component carrier filters are implemented as a frequency conversion followed by a low pass filter. Those of skill in the art will readily recognize that the particular filter methodology employed is not a constraint of the present invention.

The separate component carrier signals are then propagated to a time and frequency adjustment unit 42. The time and frequency adjustment unit 42 includes elements of the multiple component carrier receiver controller of FIG. 3, such as the timing estimators 12, 14, control unit 16, mixer 18, delay unit 20, and switching unit 22.

After the component carrier signals are aligned in time and frequency, they are combined in adder 46, and an entire OFDM symbol, spanning both component carriers (as depicted in FIG. 4), is processed by the FFT 48. While the front-end chain 30 is depicted as separating a composite signal into two component carrier signals, the present invention is not limited to this embodiment, and extension to three or more composite carrier signals is straightforward.

Figure 5:
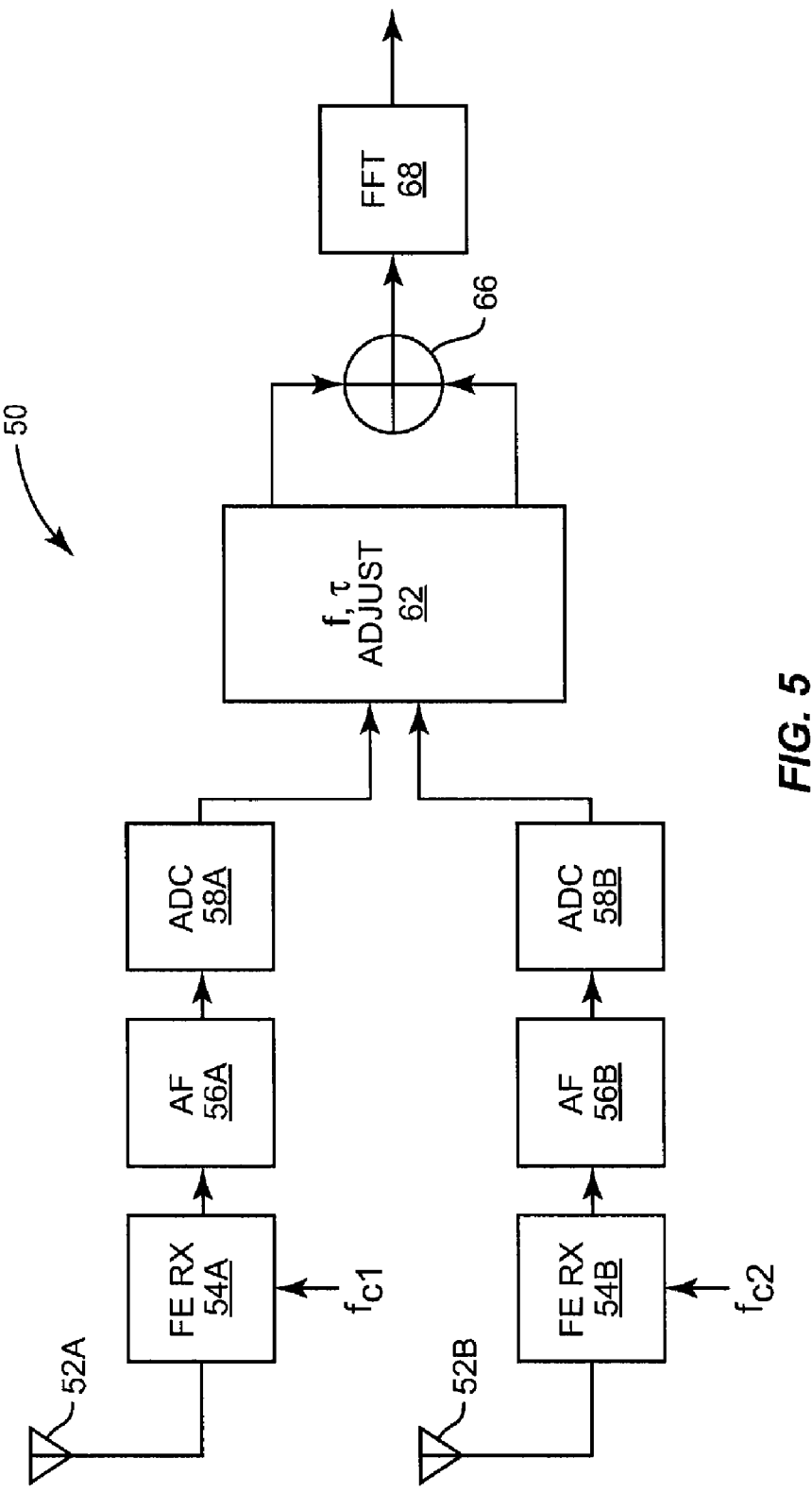
FIG. 5 is a functional block diagram of multiple front-end receiver chains for a multiple component carrier receiver.

FIG. 5 depicts a front-end receiver architecture 50 having a plurality of front-end receiver chains (two, in the embodiment depicted), according to one embodiment of the present invention. In the case of data scheduled to a receiver in two component carrier signals, each front-end chain A, B is operative to receive and front-end process a single component carrier signal. A composite signal is received at antennae 52A and 52B. The component carrier signals are frequency-selectively amplified at receiver circuits 54A, 54B, and selectively filtered at variable-frequency analog filters 56A, 56B. Although not depicted in FIG. 5 for clarity, information regarding the component carrier frequency and bandwidth for data scheduled to the receiver is obtained from, e.g., a control channel. The component carrier signals are digitized by ADCs 58A, 58B.

The separate component carrier signals are then propagated to a time and frequency adjustment unit 62 which, like unit 42 of FIG. 4, includes elements of the multiple component carrier receiver controller of FIG. 3. After the component carrier signals are aligned in time and frequency, they are combined in adder 66, and an entire OFDM symbol, spanning both component carriers (as depicted in FIG. 5), is processed by the FFT 68.

In one embodiment, a plurality of separate, single-carrier, front-end receiver chains A, B, . . . , are provided, and utilized as needed based on the number of component carrier signals having data scheduled for the receiver. In another embodiment (not shown), one or more separate, front-end receiver chains may include a component carrier filter unit 40 (see FIG. 4), and hence may receive and front-end process two or more component carrier signals. In this embodiment, a receiver having two front-end receiver chains may receive and front-end process three or more component carrier signals.

According to embodiments of the present invention, only one FFT is required per OFDM symbol spanning all relevant component carriers. This reduces the required FFT processing rate and/or requires only one FFT per receiver. This allows for a receiver at a lower cost and complexity, smaller selection area, and lower power consumption.

Those of skill in the art will recognize that the block diagrams of FIGS. 3, 4, and 5 are functional diagrams for the purpose of explaining features of corresponding embodiments of the present invention, and are not limiting. For example, various functions may be combined, or one or more of the functional blocks may be omitted, in any particular implementation. Additionally, any or all of the functional blocks—such as the timing estimators 12, 14; control unit 16; delay unit 20; switches 22; adders 24, 46, 66; FFT units 26, 48, 68; carrier component filter 40; and time and frequency adjustment units 42, 62—may be implemented as hardware circuits, programmable or configurable logic circuits with associated firmware, software modules executing on a Digital Signal Processor (DSP) or other controller, or any combination of hardware, firmware and software.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, in a wireless communication system receiver, of receiving and processing signals comprising two or more component carriers spaced apart in frequency, comprising:
    receiving and front-end processing in a wireless communication system receiver, two or more component carrier signals;
    determining the timing and relative frequency offset between a first component carrier signal and one or more other component carrier signals;
    adjusting at least one of the timing and frequency of the one or more other component carrier signals so as to time-align and frequency-align them with the first component carrier signal;
    adding the time-aligned and frequency-aligned component carrier signals to produce a single, combined signal; and
    Fast Fourier Transform processing the combined signal to detect transmitted symbols.

2. The method of claim 1 wherein adjusting the timing of the one or more other component carrier signals so as to time-align them with the first component carrier signal comprises delaying one or more of the other component carrier signals.

3. The method of claim 1 wherein adjusting the frequency of the one or more other component carrier signals comprises frequency offsetting one or more of the other component carrier signals so as to align them on the same sub-carrier raster as the first component carrier signal.

4. The method of claim 1 wherein adjusting the timing of the one or more other component carrier signals so as to time-align them with the first component carrier signal comprises delaying one or more of the other component carrier signals so that a majority of multi-path component energy for all component carriers falls within a data symbol's cyclic prefix.

5. The method of claim 1 wherein adjusting at least one of the timing and frequency of the one or more other component carrier signals so as to time-align and frequency-align them with the first component carrier signal comprises ascertaining which component carrier signals include data dedicated to the receiver, and adjusting the timing and/or frequency of only those component carrier signals.

6. The method of claim 1 wherein receiving and front-end processing the two or more component carrier signals comprises processing all received component carrier signals in a single front-end receiver chain.

7. The method of claim 1 wherein receiving and front-end processing the two or more component carrier signals comprises processing each received component carrier signal in a different front-end receiver chain.

8. The method of claim 1 wherein receiving and front-end processing the two or more component carrier signals comprises processing one or more received component carrier signals in a first front-end receiver chain, and processing one or more received component carrier signals in a second front-end receiver chain.

9. The method of claim 1 wherein the multiple component carrier signals comprise Orthogonal Frequency Division Multiplexing (OFDM) signals.

10. A receiver operative to receive and process signals comprising two or more component carriers spaced apart in frequency, comprising:
    one or more front-end receiver circuits operative to receive and front-end process two or more component carrier signals to baseband;
    a timing estimator associated with each component carrier signal, each timing estimator operative to estimate the relative timing between a first component carrier and one or more other component carriers;
    a control unit operative to receive timing estimates from the timing estimators and control information, and operative to generate frequency and timing control signals;
    a mixer operative to receive one of the baseband component carrier signals and a frequency control signal and to generate a baseband component carrier signal frequency-aligned with the first component carrier;

a delay unit operative to receive the frequency-aligned component carrier signal and a timing control signal, and operative to generate a baseband component carrier signal time-aligned with the first component carrier; and an adder operative to combine the first component carrier signal and one or more time-aligned and frequency-aligned component carrier signals to generate a single, combined signal; and a Fast Fourier Transform unit operative to detect symbols in the combined signal.

11. The receiver of claim 10 wherein the delay unit precedes the mixer in the path of one or more component carrier signals.

12. The receiver of claim 10 wherein the mixer is operative to generate a baseband component carrier signal frequency-aligned with the first component carrier such that the component carriers are fitted on the same sub-carrier raster.

13. The receiver of claim 10 wherein one or more front-end receiver circuits comprise a front-end receiver circuit dedicated to each component carrier signal to be processed.

14. The receiver of claim 10 wherein one or more front-end receiver circuits comprise one or more front-end receiver circuits, each operative to process one or more component carrier signals.

15. The receiver of claim 10 wherein one or more front-end receiver circuits comprise a plurality of front-end receiver circuits, wherein at least one front-end receiver circuit is operative to process two or more component carrier signals.

16. A controller in a receiver operative to receive and process signals comprising two or more component carriers spaced apart in frequency, the controller comprising:

a control unit operative to receive a first timing estimate for a first received component carrier signal;

receive a timing estimate for each of one or more other component carrier signals;

for each other component carrier signal, calculate and output a frequency adjustment to frequency-align the component carrier signal with the first component carrier signal; and for each other component carrier signal, calculate and output a delay value to time-align the component carrier signal with the first component carrier signal.

17. The controller of claim 16 wherein the control unit is further operative to receive an indication whether data scheduled for the receiver is in single or multiple component carrier signals, and wherein the control unit is operative to generate time and frequency adjustments only when data scheduled for the receiver is in multiple component carrier signals.

18. The controller of claim 16 wherein the control unit is further operative to output timing signals to control combining the first component carrier signal and one or more other, time- and frequency-aligned component carrier signals prior to FFT processing.

19. The controller of claim 16 wherein the control unit is further operative to adjust the frequency of the one or more other component carrier signals by frequency offsetting one or more of the other component carrier signals so as to align them on the same sub-carrier raster as the first component carrier signal.

* * * * *